(12) United States Patent
Kim et al.

(10) Patent No.: US 9,334,406 B2
(45) Date of Patent: May 10, 2016

(54) COMPOSITION FOR PRIMER COATING, OPTICAL FILM COMPRISING THE SAME, AND POLARIZING PLATE COMPRISING THE SAME

(75) Inventors: Hee-Jung Kim, Daejeon (KR); Dong-Ryul Kim, Daejeon (KR); Boong-Goon Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 802 days.

(21) Appl. No.: 12/659,090

(22) Filed: Feb. 24, 2010

(65) Prior Publication Data

US 2010/0221455 A1 Sep. 2, 2010

(30) Foreign Application Priority Data

Feb. 25, 2009 (KR) ........................ 10-2009-0015875

(51) Int. Cl.
| | |
|---|---|
| *C09K 19/00* | (2006.01) |
| *C09D 5/00* | (2006.01) |
| *C09D 4/00* | (2006.01) |
| *C09D 131/00* | (2006.01) |
| *C08L 33/06* | (2006.01) |
| *G02F 1/1335* | (2006.01) |

(52) U.S. Cl.
CPC *C09D 5/002* (2013.01); *C09D 4/00* (2013.01); *C09D 131/00* (2013.01); *C08L 33/06* (2013.01); *G02F 1/133528* (2013.01); *Y10T 428/10* (2015.01); *Y10T 428/1036* (2015.01); *Y10T 428/1059* (2015.01); *Y10T 428/265* (2015.01); *Y10T 428/31928* (2015.04)

(58) Field of Classification Search
CPC ........ C09D 4/00; C09D 5/002; C09D 131/00; C09D 131/04; C08L 33/06; C08L 33/08; C08L 33/10; C08L 33/12; C08L 2666/04; Y10T 428/265; Y10T 428/273; Y10T 428/10; Y10T 428/1036; Y10T 428/1077; Y10T 428/1082; G02F 1/133528
USPC ............. 428/1.1, 1.3, 1.5, 1.54, 1.55; 349/96; 359/485.03; 524/557; 427/162, 163.1
See application file for complete search history.

(56) References Cited

U.S. PATENT DOCUMENTS

| | | | |
|---|---|---|---|
| 6,465,078 B1 * | 10/2002 | Kawai et al. | 428/32.26 |
| 6,815,021 B1 * | 11/2004 | Ishikawa et al. | 428/32.3 |
| 2003/0082482 A1 * | 5/2003 | Wada et al. | 430/273.1 |
| 2008/0128076 A1 | 6/2008 | Nimura | |
| 2009/0291282 A1 | 11/2009 | Kitamura et al. | |

FOREIGN PATENT DOCUMENTS

| | | |
|---|---|---|
| CN | 1213343 A | 4/1999 |
| CN | 101162277 A | 4/2008 |
| CN | 101203551 | 6/2008 |

* cited by examiner

*Primary Examiner* — Ruiyun Zhang
(74) *Attorney, Agent, or Firm* — Dentons US LLP

(57) ABSTRACT

The present invention relates to a primer coating composition, an optical film including the same, and a polarizing plate including the same, the primer coating composition according to the present invention includes 1) a polyvinyl alcohol compound including the acetoacetyl group; 2) an acrylate compound that includes at least two vinyl groups; and 3) a basic catalyst, and an optical film that includes a primer layer formed from the primer coating composition has excellent transparency, optical property, mechanical strength, and attaching property to the polyvinyl alcohol polarizer.

15 Claims, No Drawings

COMPOSITION FOR PRIMER COATING, OPTICAL FILM COMPRISING THE SAME, AND POLARIZING PLATE COMPRISING THE SAME

BACKGROUND OF THE INVENTION

1. Field of the Invention

The present invention relates to a primer coating composition, an optical film including the same, and a polarizing plate including the same. More particularly, the present invention pertains to an optical film that includes a primer layer, such that transparency, optical property, mechanical strength, and attaching property to the polarizer are excellent, and the optical film may be usefully used as a polarizer protective film and the like. This application claims priority from Korean Patent Application No. 10-2009-0015875 filed on Feb. 25, 2009 in the Korean Intellectual Property Office (KIPO), the disclosure of which is incorporated herein by reference in its entirety.

2. Description of the Related Art

Recently, display technologies using various methods such as a plasma display panel (PDP), a liquid crystal display (LCD), an organic/inorganic EL display (ELD) and the like that are used instead of a known brown tube in accordance with the development of optical technologies are suggested and sold. In the above displays, use of various plastic films has been proposed, and more requirement properties have been highly developed. For example, in the case of liquid crystal displays, in order to be thinner and lightweight improve display property, various plastic films are used in a polarizing plate, a retardation film, a plastic substrate, a light guide plate and the like.

In the case of the polarizing plate, in general, it has a structure in which a triacetyl cellulose film (hereinafter, referred to as TAC film) as the protective film is layered on a polarizer by using an aqueous attaching agent composed of a polyvinyl alcohol aqueous solution. However, the polyvinyl alcohol film that is used as the polarizer and the TAC film that is used as the protective film for polarizer are not sufficient in terms of heat resistance and humidity resistance. Accordingly, if the polarizing plate including the films is used under a high temperature or high humidity atmosphere for a long time, since the degree of polarizing is lowered, the polarizer and the protective film are divided or an optical property is reduced, there are various limits in terms of the purpose. In addition, in the TAC film, the in-plane retardation ($R_{in}$) and the thickness retardation ($R_{th}$) are largely changed according to a change in the ambient temperature/humidity environment. If the polarizing plate that includes the TAC film as the protective film is applied to liquid crystal display devices, there is a problem in that the viewing angle property is changed according to the change in the ambient temperature/humidity environment, thus reducing the quality of image. In addition, since the TAC film has a high dimensional change ratio according to the change in the ambient temperature/humidity environment and a relatively large optical elasticity value, a change in retardation property locally occurs after evaluation of durability under the heat resistance and humidity resistance environment, thus easily reducing the quality of image.

In addition, in the case of when the polarizing plate is manufactured by using the TAC film as the polarizer protective film, an aqueous polyvinyl alcohol attaching agent is mainly used for adhesion to the polarizer including the polyvinyl alcohol component. At this time, in order to improve the adhesion strength, alkali treatment or corona treatment is performed on the surface of the TAC film. In the case of the known TAC film, since the hydrophilic group such as the hydroxy group is introduced to the surface of the film through the alkali treatment or the corona treatment, the adhesion strength may be ensured through hydrogen bonding to the polyvinyl alcohol attaching agent, but in the case of the acryl film, even though the corona treatment or the plasma treatment is performed, since the amount of the hydrophilic group that is introduced to the surface of the film is small, sufficient adhesion strength is not ensured.

As the material for compensating various disadvantages of the above TAC film, in the manufacturing of the polarizing plate, a cyclic olefin resin film or acryl film is proposed. However, even though the corona treatment or the plasma treatment is performed in respects to the cyclic olefin resin film or acryl film, since the amount of the hydrophilic group that is introduced to the surface of the film is small, the attaching property to the polyvinyl alcohol is low, such that there is a limit in practical application thereof.

SUMMARY OF THE INVENTION

In order to solve the problems in the related art, it is an object of the present invention to provide a primer coating composition that is coated on an optical film to show excellent attaching property to a polyvinyl alcohol polarizer, and an optical film and polarizing plate including the same.

The present invention provides a primer coating composition that comprises 1) a polyvinyl alcohol compound including the acetoacetyl group, 2) an acrylate compound that includes at least two vinyl groups, and 3) a basic catalyst.

In addition, the present invention provides an optical film that comprises a primer layer that is formed by the primer coating composition on at least one side of the film that includes the (meth)acryl resin.

In addition, the present invention provides a method for manufacturing an optical film, which comprises the steps of 1) preparing a film that includes a (meth)acryl resin; and 2) forming a primer layer by coating a primer coating composition that includes a polyvinyl alcohol compound including the acetoacetyl group, an acrylate compound that includes at least two vinyl groups, and basic catalyst on at least one side of 1) the film and curing them.

In addition, the present invention provides a liquid crystal display device that includes the optical film.

In addition, the present invention provides a polarizing plate that comprises 1) a polyvinyl alcohol polarizer; and 2) a film that is provided on at least one side of the polarizer and includes a (meth)acryl resin, wherein a primer layer that is formed by a primer coating composition including a polyvinyl alcohol compound including the acetoacetyl group, an acrylate compound that includes at least two vinyl groups, and a basic catalyst is included in a side that is contacted with the polarizer of the film that includes the (meth)acryl resin.

In addition, the present invention provides a liquid crystal display including the polarizing plate.

Since an optical film according to the present invention has excellent transparency, optical property, mechanical strength and the like and includes a primer layer that includes an acryl modified polyvinyl alcohol compound, an acrylate compound that includes at least two vinyl groups, and a basic catalyst, an attaching property to the polyvinyl alcohol polarizer is very excellent.

DETAILED DESCRIPTION OF THE PREFERRED EMBODIMENTS

Hereinafter, the present invention will be described in detail.

A primer coating composition according to the present invention comprises 1) a polyvinyl alcohol compound including the acetoacetyl group, 2) an acrylate compound that includes at least two vinyl groups, and 3) a basic catalyst.

The polyvinyl alcohol compound that includes the acetoacetyl group may be manufactured by reacting the polyvinyl alcohol compound and diketene. For example, the polyvinyl alcohol compound that includes the acetoacetyl group may be manufactured by using a method for dispersing the polyvinyl alcohol compound in a solvent such as an acetic acid and adding diketene thereto, a method for previously dissolving the polyvinyl alcohol compound in a solvent such as dimethylformamide or dioxane and adding diketene thereto, a method for directly contacting a gas or liquid phase diketene to the polyvinyl alcohol compound.

The degree of denaturing of the acetoacetyl group of the polyvinyl alcohol compound that includes the acetoacetyl group is preferably 0.1 to 40 mole % and more preferably 1 to 10 mole %. The degree of denaturing of the acetoacetyl group may be measured by NMR.

In the polarizing coating composition according to the present invention, as 2) the acrylate compound that includes at least two vinyl groups, there are 1,6-hexadiol diacrylate, ethyleneglycoldiacrylate, diethyleneglycoldiacrylate, triethyleneglycoldiacrylate, polyethyleneglycoldiacrylate, 1,4-butanedioldiacrylate, and neopentylglycoldiacrylate, and 1,6-hexadiol diacrylate is more preferable, but it is not limited thereto.

The α-site hydrogen of the acetoacetyl group is easily dissociated in the presence of a basic catalyst and the α-site carbon of the acetoacetyl group is easily added to the double bond of the acrylate, thereby forming carbon-carbon bond. Consequently, the effect that one or more acrylate that is capable of photocuring are easily introduced into polyvinyl alcohol compound is obtained.

Acrylate that includes at least two 2) vinyl groups may be added in an amount of 0.1 to 2 equivalents on the basis of the acetoacetyl group of the polyvinyl alcohol compound that includes the acetoacetyl group, and it is more preferable that it is added in an amount of 0.9 to 1.2 equivalents in order to show good adhesion strength.

In the primer coating composition according to the present invention, as 3) the basic catalyst, there are 1,8-diazabicyclo[5.4.0]undecene-7 (DBU), triethylamine, 1,5-diazabicyclo[4.3.0]non-5-ene (DBN), and tetramethyl guanidine (TMG), and 1,8-diazabicyclo[5.4.0]undecene-7 (DBU) is more preferable, but it is not limited thereto.

The 3) basic catalyst may be added in an amount of 0.1 to 1 equivalents on the basis of the acetoacetyl group of the polyvinyl alcohol compound that includes the acetoacetyl group, and it is more preferable that it is added in an amount of 0.1 to 0.2 equivalents in order to desirably perform the reaction.

Since the UV curing process may be required, the primer coating composition may further include a photocuring initiator. The photocuring initiator causes a reaction by decomposition activation by energy such as UV, and plays a role in promoting a crosslinking reaction between the vinyl groups.

As the photocuring initiator, one kind or two or more kinds of mixtures that are selected from the group consisting of benzophenon, 2,2-diethoxyacetophenon, bisdiethylaminobenzophenon, benzoyl isopropyl ether, benzyl dimethylketal, 1-hydroxy cyclohexylphenylketone, thioxanthone, 1-(4-isopropyl phenyl)-2-hydroxy-2-methyl propane-1-on, 2-hydroxy-2-methyl-1-phenyl propane-1-on, 1-[4-(2-acryloyl ethoxy)-phenyl]-2-hydroxydi-2-methyl-1-propane-1-on, diphenyl-2,4,6-trimethylbenzoyl-phosphine oxide, methylbenzoyl formate, bis(2,6-dimethoxybenzoyl)-2,4,4-trimethylpentylphosphine oxide, and 2-benzyl-2-dimethylamino-1-(4-morpholinophenyl)butanon-1 may be used, but it is not limited thereto.

It is preferable that an appropriated amount of the photocuring initiator is added in an amount of 0.1 to 5 parts by weight and more preferably 0.5 to 1.5 parts by weight on the basis of 100 parts by weight of 2) the acrylate compound that includes at least two vinyl groups.

The primer coating composition according to the present invention may further include a solvent, and as the solvent, water, alcohol and the like may be used, but it is not limited thereto. It is more preferable that the alcohols are propanol.

In addition, an optical film according to the present invention includes a primer layer that is formed by the primer coating composition on at least one side of the film that includes the (meth)acryl resin.

In the optical film according to the present invention, the primer layer may be manufactured by coating the primer coating composition according to the present invention on at least one side of the film that includes the (meth)acryl resin, and thermal curing and/or UV curing it.

It is preferable that in consideration of the productivity, the condition of the thermal curing is performed at the temperature in the range of 40 to 90° C. for 1 to 10 min. In addition, the UV curing condition is not particularly limited.

The thickness of the primer layer is a thickness after the drying, and preferably 0.01 to 10 μm and more preferably 0.03 to 5 μm.

In the optical film according to the present invention, the (meth)acryl resin may be a resin that is known in the art, and in particular, homo or copolymer of the (meth)acryl monomer, a copolymer of (meth)acryl monomer and aromatic vinyl monomer, a copolymer of (meth)acryl monomer, aromatic vinyl monomer and acid anhydride, a copolymer of (meth)acryl monomer and cyclic monomer and the like.

As the (meth)acryl monomer, it may be a compound that has a double bond between carbon atoms that are conjugated with the carbonyl group of the ester group, and its substituent group is not particularly limited. The (meth)acryl monomer that is disclosed in the present specification includes acrylate and an acrylate derivative, and it should be understood that it includes alkylacrylate, alkylmethacrylate, alkylbutacrylate and the like. For example, examples of the (meth)acryl monomer include the compound that is represented by the following Formula 1.

[Formula 1]

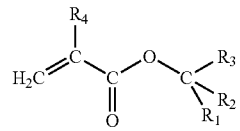

wherein $R_1$, $R_2$ and $R_3$ are each independently a hydrogen atom, or a monovalent hydrocarbon group that includes or not includes a hetero atom and has 1 to 30 carbon atoms, and at least one of $R_1$, $R_2$ and $R_3$ may be an epoxy group; $R_4$ is a hydrogen atom or an alkyl group having 1 to 6 carbon atoms.

In detail, as the (meth)acryl monomer, one or more acryl monomer that are selected from the group consisting of methylacrylate, ethylacrylate, methylmethacrylate, ethylmethacrylate, methylethacrylate, and ethylethacrylate may be used, and in particular, it is most preferable that methylmethacrylate (MMA) is used.

As the aromatic vinyl monomer, it is preferable that a monomer that has a structure in which a benzene nucleus or a vinyl group is substituted or unsubstituted by one or more $C_1$ to $C_5$ alkyl groups or halogen groups. For example, it is preferable to use one or more styrene monomers that are selected from the group consisting of styrene, α-methylstyrene, p-methylstyrene, vinyltoluene and the like.

As the acid anhydride, the carboxylic acid anhydride may be used, monovalent or polyvalent of divalent or more of carboxylic acid anhydride may be used. Preferably, maleic acid anhydride or a derivative thereof may be used, and, for example, the compound of the following Formula 2 may be used.

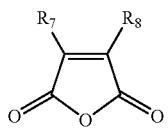

[Formula 2]

wherein $R_7$ and $R_8$ are each independently a hydrogen atom or an alkyl group having 1 to 6 carbon atoms.

As the cyclic monomer, maleic anhydride, maleimide, glutaric anhydride, glutarimide, lactone and lactam or a derivative thereof may be used, and the maleimide monomer is more preferable. The maleimide monomer includes N-cyclohexylmaleimide, N-phenylmaleimide, N-methylmaleimide, N-butylmaleimide or a derivative thereof, but is not limited thereto, and in particular, N-cyclohexylmaleimide or a derivative thereof is most preferable. The content of the cyclic monomer in the copolymer of the (meth)acryl monomer and the cyclic monomer is 1 to 50 wt % in order to lower a haze value of the film.

The film that includes the (meth)acryl resin may further include at least one of an aromatic resin that has a chain having a hydroxy group containing part and an aromatic part, a styrene resin, and a copolymer of styrene monomer and cyclic monomer.

It is preferable that the number average molecular weight of the aromatic resin that includes the chain having a hydroxy group containing part and an aromatic part is 1,500 to 2,000,000 g/mol. It is preferable that the aromatic resin includes a phenoxy resin. Herein, the phenoxy resin includes a structure in which at least one oxygen radical is bonded to a benzene ring. For example, the chain having the hydroxy group containing portion and the aromatic resin having the aromatic portion may include one or more units that are represented by the following Formula 3. The aromatic resin includes 5 to 10,000 units that are represented by the following Formula 3, more preferably 5 to 7,000 units, and more preferably 5 to 5,000 units. In the case of when two or more kinds of units that are represented by the following Formula 3 are included in the aromatic resin, they may be included in a random, alternative, or block form.

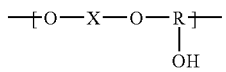

[Formula 3]

wherein

X is a divalent group that includes at least one benzene ring, and R is straight- or branched-chained alkylene having 1 to 6 carbon atoms.

In detail, it is preferable that X is a divalent group that is derived from the compounds that are represented by the following Formulas 4 to 6, but it is not limited thereto.

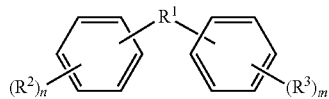

[Formula 4]

wherein $R^1$ is a direct bond, straight- or branched-chained alkylene having 1 to 6 carbon atoms, or cycloalkylidene having 3 to 20 carbon atoms, $R^2$ and $R^3$ are each independently hydrogen, straight- or branched-chained alkyl having 1 to 6 carbon atoms, or straight- or branched-chained alkenyl having 2 to 6 carbon atoms, and n and m are each independently an integer in the range of 1 to 5.

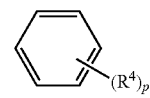

[Formula 5]

wherein $R^4$ is each independently hydrogen, straight- or branched-chained alkyl having 1 to 6 carbon atoms, or straight- or branched-chained alkenyl having 2 to 6 carbon atoms, and p is an integer in the range of 1 to 6.

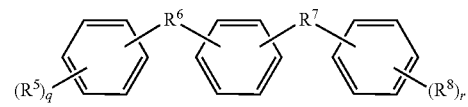

[Formula 6]

wherein $R^6$ and $R^7$ are each independently a direct bond, straight- or branched-chained alkylene having 1 to 6 carbon atoms, or cycloalkylidene having 3 to 20 carbon atoms, $R^5$ and $R^8$ are each independently hydrogen, straight- or branched-chained alkyl having 1 to 6 carbon atoms, or straight- or branched-chained alkenyl having 2 to 6 carbon atoms, and q and r are each independently an integer in the range of 1 to 5.

Detailed examples of the compounds that are represented by Formulas 4 to 6 are shown below, but are not limited thereto.

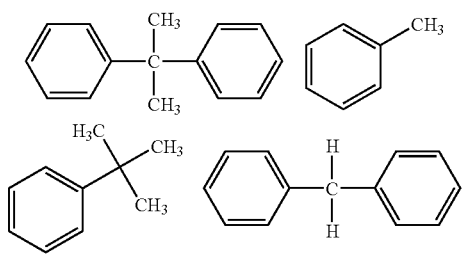

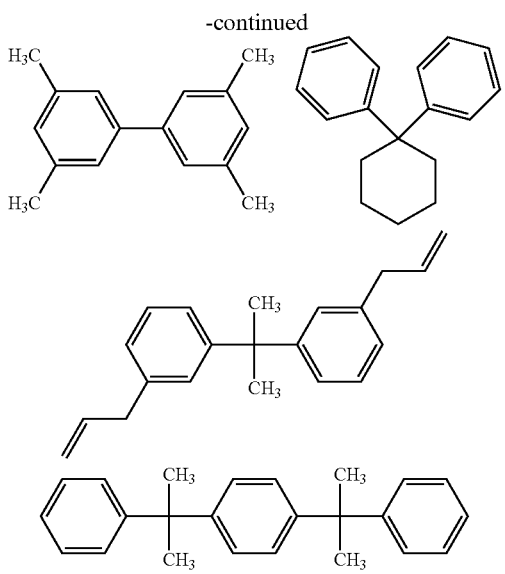

It is most preferable that the aromatic resin includes 5 to 10,000 one or more kinds of phenoxy units that are represented by the following Formula 7.

[Formula 7]

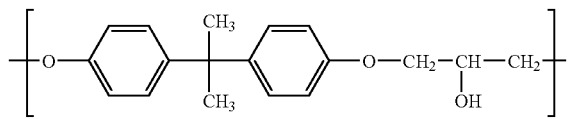

The terminal of the aromatic resin may be an OH group.

In the case of when the film that includes the (meth)acryl resin includes the aromatic resin including the chain having a hydroxy group containing part and the aromatic part, the content of the (meth)acryl resin is preferably about 40 to 99 wt %, more preferably about 70 to 98 wt %, and the content of the aromatic resin is preferably about 1 to 60 wt % and more preferably about 2 to 30 wt %.

In the case of when the film that includes the (meth)acryl resin includes the styrene resin, the content of the (meth)acryl resin is preferably about 40 to 99 wt %, more preferably about 70 to 98 wt %, and the content of the styrene resin is preferably about 0.5 to 30 wt % and more preferably about 1 to 20 wt %.

In the case of when the copolymer of the styrene monomer and the cyclic monomer is used, the content of the cyclic monomer of the copolymer is about 1 to 99 wt %, preferably about 1 to 70 wt %, and more preferably about 5 to 60 wt %.

In the case of when the film that includes the (meth)acryl resin includes the copolymer of the styrene resin or the styrene monomer and the cyclic monomer in conjunction with the aromatic resin including the chain having a hydroxy group containing part and the aromatic part, the content of the (meth)acryl resin is preferably about 50 to 99 wt % and more preferably about 75 to 98 wt %, the content of the aromatic resin is preferably about 0.5 to 40 wt % and more preferably about 1 to 30 wt %, and the content of the copolymer of the styrene resin or styrene monomer and the cyclic monomer is preferably about 0.5 to 30 wt % and more preferably about 1 to 20 wt %.

In the related art, in the manufacturing of the polarizing plate, in general, the polarizer and polarizer protective film are combined with each other by using an attaching agent layer that includes polyvinyl alcohol including the acetoacetyl group. However, in the case of when the (meth)acryl film is used as the polarizer protective film, even though the attaching agent layer that includes polyvinyl alcohol including the acetoacetyl group is used, there is a problem in that good adhesion strength between the polarizer and the polarizer protective film does not occur. In addition, good adhesion strength between the polarizer and the polarizer protective film does not occur by only performing the corona treatment or physical treatment in respects to the (meth)acryl film.

On the other hand, in the optical film according to the present invention, since most of the primer layer includes polyvinyl alcohol, the surface of the (meth)acryl optical film on which the primer layer is coated has a hydrophilic property by the polyvinyl alcohol. Hence, when the (meth)acryl film on which the primer layer is coated is used, and the attaching agent layer that includes polyvinyl alcohol including the acetoacetyl group is added thereto, very good adhesion strength between the polarizer and the (meth)acryl films on which the primer layer are coated may be provided. In addition, there is an advantage in that, as the attaching agent layer, the attaching agent layer that includes polyvinyl alcohol including the acetoacetyl group and the polyvinyl alcohol compound that is known in the art without a limit is available.

The optical film according to the present invention may be used as the polarizer protective film.

In the case of when the optical film according to the present invention is used as the polarizer protective film, the transparency, optical property, mechanical strength and the like are excellent, and since the primer layer that includes the acryl modified polyvinyl alcohol compound is included, the attaching property to the polyvinyl alcohol polarizer is very excellent.

In particular, since the optical film according to the present invention has a contact angle of 50° or less in the primer layer, there is an advantage in that the corona treatment process that is a process performed in order to improve the adhesion strength in the art may be omitted. The contact angle may be more than 0° and 50° or less.

In addition, the method for manufacturing the optical film according to the present invention comprises the steps of 1) preparing a film that includes a (meth)acryl resin, and 2) forming a primer layer by coating a primer coating composition that includes a polyvinyl alcohol compound including the acetoacetyl group, an acrylate compound that includes at least two vinyl groups, and basic catalyst on at least one side of 1) the film and curing them.

In the method for manufacturing the optical film according to the present invention, since the description of the (meth) acryl resin, polyvinyl alcohol compound including the acetoacetyl group, acrylate compound that includes at least two vinyl groups, the basic catalyst and the like is the same as the above description, a detailed description thereof will be omitted.

In the method for manufacturing the optical film according to the present invention, since 2) the primer coating composition is a mixture of a polyvinyl alcohol compound having hydrophilicity and an acrylate compound having hydrophobicity, when the primer coating composition is coated, the relative humidity in the air affects the degree of hydrophilic property of the surface of the primer layer. Accordingly, in order to form the primer layer that shows an appropriate function, when the primer coating composition is coated, the relative humidity in the air is preferably at least 40 to 100% and more preferably 50 to 90%.

In addition, the present invention provides a liquid crystal display device that includes the optical film.

For example, the present invention provides an image display device that includes a light source, a first polarizing plate, a liquid crystal cell, and a second polarizing plate that are sequentially layered, and that includes the optical film according to the present invention as at least one protective film of the first polarizing plate and the second polarizing plate.

The liquid crystal cell comprises a liquid crystal layer, a substrate that can support it, and an electrode layer for applying a voltage to the liquid crystal. At this time, the polarizing plate according to the present invention may be applied to all liquid crystal modes such as In-Plane Switching mode (IPS mode), Vertically Aligned mode (VA mode), Optically Compensated Birefringence mode, Twisted Nematic mode (TN mode), Fringe Field Switching mode (FFS mode).

In addition, the present invention provides a polarizing plate that comprises 1) a polyvinyl alcohol polarizer; and 2) a film that is provided on at least one side of the polarizer and includes a (meth)acryl resin, wherein a primer layer that is formed by a primer coating composition including a polyvinyl alcohol compound including the acetoacetyl group, an acrylate compound that includes at least two vinyl groups, and a basic catalyst is included in a side that is contacted with the polarizer of the film that includes the (meth)acryl resin.

In the polarizing plate according to the present invention, since the description of the (meth)acryl resin, polyvinyl alcohol compound including the acetoacetyl group, acrylate compound that includes at least two vinyl groups, the basic catalyst and the like is the same as the above description, a detailed description thereof will be omitted.

In the polarizing plate according to the present invention, the film that includes the (meth)acryl resin may be provided on both sides of the polarizer. In addition, the film is provided on any one side of the polarizer, and the polarizer protective film that is known in the art, for example, the TAC film, the PET film, the COP film, the PC film, the polynorbornene film and the like may be provided on the other side thereof.

In the polarizing plate according to the present invention, the attachment of the film and the polarizer that includes the (meth)acryl resin may be performed by using the attaching agent layer. As the attaching agent that can be used when the film and the polarizing plate are laminated, if it is known in the art, it is not particularly limited. For example, there are a one- or two-liquid type polyvinyl alcohol (PVA) attaching agent, a polyurethane attaching agent, an epoxy attaching agent, a styrene-butadiene rubber (SBR) attaching agent, or a hot melt attaching agent or the like, but it is not limited thereto. Among the attaching agents, the polyvinyl alcohol attaching agent is more preferable.

The attachment of the polarizer and the film may be performed a method for first coating the attaching agent by using a roll coater, a gravure coater, a bar coater, a knife coater, or a capillary coater or the like on the surface of the PVA film that is the protective film for polarizer or polarizer, and before the attaching agent is completely dried, heating and pressuring the protective film and the polarizing layer by a lamination roll or pressuring them at normal temperature to perform the lamination. In the case of when the hot melt adhesive is used, the heating pressing roll should be used.

In the case of when polyurethane attaching agent is used, it is preferable to use a polyurethane attaching agent that is manufactured by using an aliphatic isocyanate compound that is not yellowed by light. In the case of when an attaching agent for one component or two component dry laminate or an attaching agent that has relatively low reactivity to isocyanate and hydroxyl group is used, a solution adhesion agent that is diluted by an acetate solvent, a ketone solvent, an ether solvent or an aromatic solvent may be used. At this time, it is preferable that the attaching agent is a low viscosity type having the viscosity of 5000 cps or less. The above attaching agent has excellent storage stability, and it is preferable that the light transmittance of them at 400 to 800 nm is 90% or more.

If an adhesion agent has sufficient adhesion strength, it may be used as the adhesion agent. It is preferable that the adhesion agent is sufficiently cured by heat or UV and mechanical strength is improved to the level of the case of attaching agent, and surface attachment strength is large, such that it has adhesion strength so that it is not stripped as long as any one of both films to which the adhesion agent is attached is damaged.

Specific examples of the attaching agent may include natural rubber, synthetic rubber, or elastomer, a vinyl chloride/vinyl acetate copolymer, polyvinyl alkyl ether, polyacrylate, modified polyolefin attaching agent, and a curable attaching agent containing a curing agent such as isocyanate, which have excellent optical transparency.

The polarizing plate that is manufactured as described above may be used for various purposes. In detail, it may be preferably used to an image display device that includes a polarizing plate for a liquid crystal display device (LCD), a polarizing plate for preventing reflection of an organic EL display device and the like. In addition, the optical film according to the present invention may be applied various functional layers, for example, a complex polarizing plate obtained by combining various optical layers such as a retardation plate of $\lambda/4$ plate, $\lambda/2$ plate and the like, an optical diffusion plate, a viewing angle expansion plate, a brightness improving plate, a reflective plate.

The polarizing plate may be provided with an adhesion agent layer on at least one side thereof so as to easily apply to image display devices and the like. In addition, until the polarizing plate is applied to the image display device and the like, in order to protect the adhesion agent layer, a release film may be further provided on the adhesion agent layer.

In addition, the present invention provides a liquid crystal display including the polarizing plate.

For example, the present invention provides an image display device that includes a light source, a first polarizing plate, a liquid crystal cell, and a second polarizing plate that are sequentially layered, and that includes the optical film according to the present invention as at least one protective film of the first polarizing plate and the second polarizing plate.

The liquid crystal cell comprises a liquid crystal layer, a substrate that can support it, and an electrode layer for applying a voltage to the liquid crystal. At this time, the polarizing plate according to the present invention may be applied to all liquid crystal modes such as In-Plane Switching mode (IPS mode), Vertically Aligned mode (VA mode), Optically Compensated Birefringence mode, Twisted Nematic mode (TN mode), Fringe Field Switching mode (FFS mode).

A better understanding of the present invention may be obtained in light of the following Examples which are set forth to illustrate, but are not to be construed to limit the present invention.

EXAMPLE

<Manufacturing of the Polarizing Film (Polarizer)>

While the polyvinyl alcohol film that had the thickness of 75 μm was moved by using the guide roll, it was immersed in the dyeing solution of iodine and potassium iodide and the stretching treatment was performed by about 3 to 5 times. Subsequently, the crosslinking treatment was performed by adding the film to the boric acid and potassium iodide, and drying it at 80° C. for 5 to 8 min, thereby obtaining the polarizing film.

performed under the condition of temperature: 25 to 27° C., and relative humidity: 50% or more) and curing it (condition: thermal curing (80° C., 5 min), and UV curing (mercury lamp 4 m/min, 20 sec)). The composition of the film is described in the following Table 1, and characteristics of the film are described in the following Table 2.

TABLE 1

|  | Deformed PVA (parts by weight) | DBU (parts by weight) | HDDA (parts by weight) | Initiator (parts by weight) | Water (parts by weight) | Propanol (parts by weight) | Solid (%) |
| --- | --- | --- | --- | --- | --- | --- | --- |
| Example 1 | 100 | 4.4 | 34 | 0.34 | 900 | 550 | 6.45 |
| Example 2 | 100 | 3.5 | 34 | 0.34 | 900 | 515 | 6.6 |
| Example 3 | 100 | 3 | 34 | 0.34 | 900 | 550 | 6.6 |
| Example 4 | 100 | 2.5 | 34 | 0.34 | 900 | 515 | 6.6 |
| Example 5 | 100 | 4.4 | 25 | 0.25 | 900 | 500 | 6.67 |
| Example 6 | 100 | 4.4 | 20 | 0.2 | 900 | 550 | 6.45 |
| Example 7 | 100 | 3 | 34 | 0.25 | 900 | 550 | 6.60 |
| Example 8 | 100 | 3 | 34 | 0.17 | 900 | 550 | 6.60 |

DBU: 1,8-diazabicyclo[5.4.0]undecene-7
HDDA: 1,6-hexadiol diacrylate, HDDA)
Initiator: mixing at TPO/IR907 = 3:1 weight ratio (manufactured by Ciba, Co., Ltd.)

<Manufacturing of the Acryl Film>

The raw material pellet was manufactured by providing the resin composition in which poly(N-cyclohexylmaleimide-co-methylmethacrylate) resin and the phenoxy resin were uniformly mixed with each other at the weight ratio of 85:15 to the 16Φ extruder in which a portion from the raw material hopper to the extruder was substituted by nitrogen and melting them at 250° C.

PKFE (Mw=60,000, Mn=16,000, Tg=98° C.) that was manufactured by InChemRez®, Co., Ltd. was used as the phenoxy resin, and in the poly(N-cyclohexylmaleimide-co-methylmethacrylate) resin, as a result of the NMR analysis, the content of N-cyclohexylmaleimide was 6.5 wt %.

The obtained raw material pellet was dried under the vacuum, melted by the extruder at 250° C., passed through the coat hanger-type T-die, and passed through the chrome plating casting roll and the drying roll to manufacture the acryl film having the thickness of 80 μm.

<Manufacturing of the Attaching Agent>

The 3.8% aqueous solution was manufactured by dissolving polyvinyl alcohol (average polymerization degree 2000, saponification degree 94%) that included the acetoacetyl group (5%) in pure water. The 3.8% aqueous solution was manufactured by dissolving the zirconium amine compound (trademark: AC-7, Company name: Daichi Kigenso Kagaku Kogyo) in pure water. The zirconium amine compound aqueous solution was added to the polyvinyl alcohol aqueous solution that was manufactured as described above at a ratio of 20 parts by weight on the basis of 100 parts by weight of the polyvinyl alcohol, agitated, and mixed. The pH was controlled to 8.5 by adding the 1M chloric acid aqueous solution to the mixture solution.

Examples 1 to 8

Preparation of the Primer Composition and Coating on the Optical Film

The 10 wt % aqueous solution was prepared by dissolving PVA (polymerization degree: 200 to 600) including the acetoacetyl group in the amount of 7 mol % with heating. Next, the primer coating composition was prepared by adding the composition that was described in Table 1, and agitating it at room temperature. The film was manufactured by coating the primer coating composition on the acryl film (it was

TABLE 2

|  | Stickiness | Contact angle (initial) | Contact angle (after 2 min) |
| --- | --- | --- | --- |
| Example 1 | Hard | 49 | 41 |
| Example 2 | Hard | 53 | 46 |
| Example 3 | Hard | 50 | 45 |
| Example 4 | Hard | 50 | 45 |
| Example 5 | Hard | 53 | 48 |
| Example 6 | Hard | 51 | 45 |
| Example 7 | Hard | 51 | 43 |
| Example 8 | Hard | 50 | 42 |

The stickiness was evaluated as the degree of non-stain in the primer layer before and after the primer layer was contacted with hands.

The contact angle of the primer layer was measured by using the contact angle measuring device that was manufactured by Kruss, Co., Ltd. The optical film on which the primer layer was coated was fixed to the stage, one drop of distilled water was added thereonto, and left for 2 min and measured.

Experimental Examples 1 to 8

Manufacturing of the Polarizing Plate

The polarizing plate was manufactured by sequentially laminating the optical film, the PVA element, and the TAC film, and using the attaching agent between the films. Since the contact angle of the primer layer was 50° or less, the corona process was omitted. After the lamination was performed by using the laminator under the condition of room temperature and speed 9, it was dried at 80° C. for 5 min (oven, ventilation drying system). Next, the attaching strength of the film was measured, and it is described in the following Table 3.

TABLE 3

|  |  | Attaching agent | | Attaching agent-10 | | Attaching agent-20 | |
| --- | --- | --- | --- | --- | --- | --- | --- |
|  | Optical film | M1 | M3 | M1 | M3 | M1 | M3 |
| Example 1 | Example 1 | ○ | Δ | ○ | Δ | ○ | ○ |
| Example 2 | Example 2 | ○ | Δ | ○ | ○ | ○ | ○ |

TABLE 3-continued

| | Optical film | Attaching agent | | Attaching agent-10 | | Attaching agent-20 | |
|---|---|---|---|---|---|---|---|
| | | M1 | M3 | M1 | M3 | M1 | M3 |
| Example 3 | Example 3 | ○ | Δ | ○ | ○ | — | — |
| Example 4 | Example 4 | ○ | Δ | ○ | ○ | ○ | ○ |
| Example 5 | Example 5 | ○ | Δ | ○ | Δ | ○ | Δ |
| Example 6 | Example 6 | ○ | Δ | ○ | Δ | ○ | Δ |
| Example 7 | Example 7 | ○ | Δ | ○ | ○ | ○ | ○ |
| Example 8 | Example 8 | ○ | Δ | ○ | Δ | ○ | ○ |

M1: The degree of non-spread of the film when cuts were formed
M3: The degree of peeling when cuts were formed and the peeling was performed by adding shear to the film (Δ: slight peeling occurs at an early step as compared to TAC or peeling by strong force, X: peeling at an early step)
Attaching agent-10: Attaching agent in which 10 parts by weight of MEK was added to 100 parts by weight of attaching agent
Attaching agent-20: Attaching agent in which 20 parts by weight of MEK was added to 100 parts by weight of attaching agent Comparative Experimental Examples 1 to 3

Manufacturing of the Polarizing Plate

The polarizing plate was manufactured by performing the corona treatment to the acryl optical film while the acryl film was not subjected to the primer layer treatment, sequentially laminating the optical film, the PVA element, and the TAC film, and using the attaching agent between the films. After the lamination was performed by using the laminator under the condition of room temperature and speed 9, it was dried at 80° C. for 5 min (oven, ventilation drying system). Next, the attaching strength of the film was measured, and it is described in the following Table 4.

TABLE 4

| | | Comparative Experimental Example 1 | Comparative Experimental Example 2 | Comparative Experimental Example 3 |
|---|---|---|---|---|
| Corona treatment time (SCE) | | 0 | 10 | 20 |
| Contact angle | | 78 | 73 | 48 |
| Attaching agent | M1 | X | X | X |
| | M3 | X | X | X |
| Attaching agent - 10 | M1 | X | X | X |
| | M3 | X | X | X |
| Attaching agent - 20 | M1 | X | X | X |
| | M3 | X | X | X |

As described above, since an optical film according to the present invention includes a primer layer that includes a polyvinyl alcohol compound including the acetoacetyl group, an acrylate compound that includes at least two vinyl groups, and a basic catalyst, an attaching property to the polyvinyl alcohol polarizer is very excellent.

What is claimed is:

1. A polarizing plate comprising:
   1) a polyvinylalcohol polarizer;
   2) a film that is provided on at least one side of the polarizer and includes a (meth)acryl resin; and
   3) a primer layer that is formed by a primer coating composition disposed on a side of the film that contacts the polarizer,
   wherein the primer coating composition includes:
      a polyvinyl alcohol compound including an acetoacetyl group having a degree of denaturing of 0.1 to 40 mole %;
      an acrylate compound including at least two vinyl groups;
      a basic catalyst; and
      0.5 to 1.5 parts by weight of a photocuring initiator, relative to 100 parts by weight of the acrylate compound,
   wherein the content of the acrylate compound is 0.1 to 2 equivalents on the basis of the acetoacetyl group of the polyvinyl alcohol compound in the primer coating composition, and
   wherein the content of the basic catalyst is 0.1 to 1 equivalents on the basis of the acetoacetyl group of the polyvinyl alcohol compound in the primer coating composition.

2. The polarizing plate as set forth in claim 1, wherein the acrylate compound that includes at least two vinyl groups includes one or more that are selected from the group consisting of 1,6-hexadiol diacrylate, ethyleneglycoldiacrylate, diethyleneglycoldiacrylate, triethyleneglycoldiacrylate, polyethyleneglycoldiacrylate, 1,4-butanedioldiacrylate, and neopentylglycoldiacrylate.

3. The polarizing plate as set forth in claim 1, wherein the basic catalyst includes one or more that are selected from the group consisting of 1,8-diazabicyclo[5.4.0]undecene-7 (DBU), triethylamine, 1,5-diazabicyclo[4.3.0]non-5-ene (DBN), and tetramethylguanidine (TMG).

4. The polarizing plate as set forth in claim 1, wherein the film that includes the (meth)acryl resin is provided on both sides of the polarizer.

5. The polarizing plate as set forth in claim 1, wherein the film that includes the (meth)acryl resin is provided on any one side of the polarizer, and a film that is selected from the group consisting of a TAC film, PET film, COP film, PC film and polynorbornene film is provided on another side.

6. The polarizing plate as set forth in claim 1, wherein the (meth)acryl resin includes one or more that are selected from the group consisting of homo or copolymer of the (meth)acryl monomer, a copolymer of (meth)acryl monomer and aromatic vinyl monomer, a copolymer of (meth)acryl monomer, aromatic vinyl monomer and acid anhydride, and a copolymer of (meth)acryl monomer and cyclic monomer.

7. The polarizing plate as set forth in claim 1, wherein the film that includes the (meth)acryl resin further includes one or more that are selected from the group consisting of an aromatic resin that has a chain having a hydroxy group containing part and an aromatic part, a styrene resin, and a copolymer of styrene monomer and cyclic monomer.

8. A primer coating composition comprising:
   1) a polyvinyl alcohol compound including an acetoacetyl group having a degree of denaturing of 0.1 to 40 mole %;
   2) an acrylate compound that includes at least two vinyl groups;
   3) a basic catalyst; and
   4) 0.5 to 1.5 parts by weight of a photocuring initiator, relative to 100 parts by weight of the acrylate compound,
   wherein the content of the acrylate compound is 0.1 to 2 equivalents on the basis of the acetoacetyl group of the polyvinyl alcohol compound, and
   wherein the content of the basic catalyst is 0.1 to 1 equivalents on the basis of the acetoacetyl group of the polyvinyl alcohol compound.

9. The primer coating composition as set forth in claim 8, wherein 2) the acrylate compound that includes at least two vinyl groups includes one or more that are selected from the group consisting of 1,6-hexadiol diacrylate, ethyleneglycoldiacrylate, diethyleneglycoldiacrylate, triethyleneglycoldiacrylate, polyethyleneglycoldiacrylate, 1,4-butanedioldiacrylate, and neopentylglycoldiacrylate.

10. The primer coating composition as set forth in claim 8, wherein 3) the basic catalyst includes one or more that are selected from the group consisting of 1,8-diazabicyclo[5.4.0] undecene-7 (DBU), triethylamine, 1,5-diazabicyclo[4.3.0] non-5-ene (DBN), and tetramethylguanidine (TMG).

11. An optical film comprising—a primer layer that is formed by the primer coating composition according to claim 8 on at least one side of the film that includes a (meth)acryl resin.

12. The optical film as set forth in claim 11, wherein the thickness of the primer layer is 0.01 to 10 μm.

13. The optical film as set forth in claim 11, wherein the optical film is used for a polarizer protective film.

14. A liquid crystal display device comprising the optical film of claim 11.

15. A liquid crystal display device comprising the polarizing plate of claim 1.

\* \* \* \* \*